United States Patent
Bulakci et al.

(10) Patent No.: US 12,507,144 B2
(45) Date of Patent: Dec. 23, 2025

(54) HANDOVER FOR A DEVICE SERVED BY AN IAB NODE

(71) Applicant: Nokia Technologies Oy, Espoo (FI)

(72) Inventors: Omer Bulakci, Munich (DE); Hajo Bakker, Eberdingen (DE); Ilkka Keskitalo, Oulu (FI); Oliver Blume, Stuttgart (DE); Xiang Xu, Suzhou (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 366 days.

(21) Appl. No.: 18/028,855

(22) PCT Filed: Sep. 29, 2020

(86) PCT No.: PCT/CN2020/119057
§ 371 (c)(1),
(2) Date: Mar. 28, 2023

(87) PCT Pub. No.: WO2022/067577
PCT Pub. Date: Apr. 7, 2022

(65) Prior Publication Data
US 2023/0292213 A1     Sep. 14, 2023

(51) Int. Cl.
*H04W 36/32*     (2009.01)
(52) U.S. Cl.
CPC ....... *H04W 36/322* (2023.05); *H04W 36/326* (2023.05)
(58) Field of Classification Search
CPC ......... H04W 36/00837; H04W 36/083; H04W 36/32; H04W 36/322; H04W 36/326; H04W 88/04
See application file for complete search history.

(56) References Cited

U.S. PATENT DOCUMENTS

| | | | |
|---|---|---|---|
| 9,949,192 | B1 | 4/2018 | Saleh et al. |
| 2010/0272268 | A1 | 10/2010 | Sambhwani et al. |
| | | (Continued) | |

FOREIGN PATENT DOCUMENTS

| | | |
|---|---|---|
| CN | 104081823 A | 10/2014 |
| CN | 110621050 A | 12/2019 |
| | (Continued) | |

OTHER PUBLICATIONS

Office Action received for corresponding Chinese Patent Application No. 202080105612.0, dated Oct. 28, 2024, 7 pages of Office Action and no page of translation available.

(Continued)

*Primary Examiner* — Zhensheng Zhang
(74) *Attorney, Agent, or Firm* — Carter, DeLuca & Farrell LLP

(57) ABSTRACT

Example embodiments of the present disclosure relate to handover for a device(s) served by an Integrated Access and Backhaul (IAB) node. A first device receives indication information indicating a change of service availability of a second device that serves at least one third device. The first device determines, based on the indication information, whether a handover of the at least one third device from the second device is to be triggered. In accordance with a determination that the handover of the at least one third device is to be triggered, the first device transmits, to the second device, handover information indicating at least one fourth device selected for the handover of the at least one third device from the second device.

1 Claim, 7 Drawing Sheets

(56) References Cited

U.S. PATENT DOCUMENTS

| | | | |
|---|---|---|---|
| 2011/0249558 A1* | 10/2011 | Raaf | H04W 24/02 370/252 |
| 2011/0256826 A1 | 10/2011 | Ode et al. | |
| 2016/0081055 A1 | 3/2016 | Chika et al. | |
| 2019/0215055 A1 | 7/2019 | Majmundar et al. | |
| 2020/0045610 A1 | 2/2020 | Shih et al. | |
| 2020/0053629 A1 | 2/2020 | Majmundar et al. | |
| 2021/0315043 A1* | 10/2021 | Luo | H04W 72/27 |

FOREIGN PATENT DOCUMENTS

| | | | |
|---|---|---|---|
| CN | 110636562 A | 12/2019 | |
| CN | 110636570 A | 12/2019 | |
| CN | 110740485 A | 1/2020 | |
| CN | 111586744 A | 8/2020 | |
| WO | 2016/055108 A1 | 4/2016 | |
| WO | 2017/012669 A1 | 1/2017 | |
| WO | 2020/069158 A1 | 4/2020 | |
| WO | 2020/090988 A1 | 5/2020 | |
| WO | 2021/068257 A1 | 4/2021 | |

OTHER PUBLICATIONS

Samsung, "Motivation for New WID on Extension of Integrated Access and Backhaul (IAB) for NR," 3GPP TSG RAN Meeting #84, RP-191181, Jun. 3-6, 2019, Newport Beach, USA.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"New SID: Study on vehicle-mounted relays", 3GPP SA WG1 Meeting #90-e, S1-202095, Agenda Item: 4, Qualcomm Incorporated, May 18-22, 2020, 3 pages.

"New Rel-18 Study Proposal on Vehicle Relays", 3GPP SA WG1 Meeting #90-e, S1-202096, Qualcomm, May 18-22, 2020, pp. 1-8.

"Inter IAB donor-CU topology adaptation", 3GPP TSG-RAN WG3 Meeting #106, R3-196995, Agenda Item: 13.3.2.3, Huawei, Nov. 18-22, 2019, pp. 1-4.

"Deliverable D4.2 Final air interface harmonization and user plane design", Metis II, Mobile and wireless communications Enablers for the Twenty-twenty Information Society-II, v1.0, Apr. 30, 2017, pp. 1-109.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; NG-RAN; F1 application protocol (F1AP) (Release 16)", 3GPP TS 38.473, V16.1.0, Mar. 2020, pp. 1-240.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"IEEE 802.11", Wikipedia, Retrieved on May 24, 2024, Webpage available at : https://en.wikipedia.org/wiki/IEEE_802.11.

Office Action received for corresponding Chinese Patent Application No. 202080105612.0, dated May 6, 2024, 11 pages of office action and English translation, 5 pages, total 16 pages.

"Conditional handover upon BH RLF in IAB", 3GPP TSG-RAN WG2 #110-e, R2-2004782, Agenda item: 6.1.2, Kyocera, Jun. 1-12, 2020, 8 pages.

Extended European Search Report received for corresponding European Patent Application No. 20955602.6, dated May 22, 2024, 16 pages.

* cited by examiner

# HANDOVER FOR A DEVICE SERVED BY AN IAB NODE

CROSS REFERENCE TO RELATED APPLICATION

This patent application is a U.S. National Stage application of International Patent Application Number PCT/CN2020/119057 filed Sep. 29, 2020, which is hereby incorporated by reference in its entirety.

FIELD

Embodiments of the present disclosure generally relate to the field of telecommunication and in particular, to methods, devices, apparatuses and computer readable storage medium of handover for a device(s) served by an Integrated Access and Backhaul (IAB) node.

BACKGROUND

Integrated Access and Backhaul (JAB) has been introduced in communication systems as a key enabler for fast and cost-efficient deployments. For example, JAB may enable dense mmWave deployment outdoors. JAB nodes can behave like base stations, providing the radio interface for terminal devices in their coverage areas. The JAB nodes may use the same spectrum and air interface for access and backhaul, creating a single-hop or a hierarchical multi-hop network between sites. The hops terminate at a donor node which is referred to as an IAB donor node (or JAB-donor). The IAB donor node may be connected by means of a fixed backhaul to a core network.

Handover procedures of terminal devices may be triggered from one JAB node toward another JAB node. Currently, as mobile JAB nodes are expected in the development of the communication systems, there are new challenges for the handover procedures.

SUMMARY

In general, example embodiments of the present disclosure provide a solution of handover for a device(s) served by an JAB node. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to, with the at least one processor, cause the first device to receive indication information indicating a change of service availability of a second device, the second device serving at least one third device; determine, based on the indication information, whether a handover of the at least one third device from the second device is to be triggered; and in accordance with a determination that the handover of the at least one third device is to be triggered, transmit, to the second device, handover information indicating at least one fourth device selected for the handover of the at least one third device from the second device.

In a second aspect, there is provided a second device. The second device comprises at least one processor; and at least one memory including computer program code; where the at least one memory and the computer program code are configured to, with the at least one processor, cause the second device to independent of a measurement report from at least one third device, receive, from a first device, handover information indicating at least one fourth device selected for a handover of at least one third device from the second device, the second device serving at least one third device; and transmit, to the at least one third device, reconfiguration information for configuring the at least one third device to perform a handover from the second device to the at least one fourth device.

In a third aspect, there is provided a fifth device. The second device comprises at least one processor; and at least one memory including computer program code; where the at least one memory and the computer program code are configured to, with the at least one processor, cause the fifth device to receive indication information indicating a change of service availability of a second device, the second device serving at least one third device and being managed by the fifth device; determine, based on the indication information, whether the second device is to be replaced; in accordance with a determination that the second device is to be replaced, activate a fourth device to replace the second device in serving the at least one third device; and cause further indication information to be transmitted to a first device connected with the second device, the further indication information indicating that the fourth device is to replace the second device in serving the at least one third device.

In a fourth aspect, there is provided a method. The method comprises receiving, at a first device, indication information indicating a change of service availability of a second device, the second device serving at least one third device; determining, based on the indication information, whether a handover of the at least one third device from the second device is to be triggered; and in accordance with a determination that the handover of the at least one third device is to be triggered, transmitting, to the second device, handover information indicating at least one fourth device selected for the handover of the at least one third device from the second device.

In a fifth aspect, there is provided a method. The method comprises independent of a measurement report from at least one third device, receiving, at a second device and from a first device, handover information indicating at least one fourth device selected for a handover of at least one third device from the second device, the second device serving the at least one third device; and transmitting, to the at least one third device, reconfiguration information for configuring the at least one third device to perform a handover from the second device to the at least one fourth device.

In a sixth aspect, there is provided a method. The method comprises receiving, at a fifth apparatus, indication information indicating a change of service availability of a second apparatus, the second apparatus serving at least one third apparatus and being managed by the fifth apparatus; determining, based on the indication information, whether the second apparatus is to be replaced; in accordance with a determination that the second apparatus is to be replaced, activating a fourth apparatus to replace the second apparatus in serving the at least one third apparatus; and causing further indication information to be transmitted to a first apparatus connected with the second apparatus, the further indication information indicating that the fourth apparatus is to replace the second apparatus in serving the at least one third apparatus.

In a seventh aspect, there is provided a first apparatus. The first apparatus comprises means for receiving indication information indicating a change of service availability of a second apparatus, the second apparatus serving at least one third apparatus; means for determining, based on the indication information, whether a handover of the at least one third apparatus from the second apparatus is to be triggered; and means for, in accordance with a determination that the handover of the at least one third apparatus is to be triggered, transmitting, to the second apparatus, handover information indicating at least one fourth apparatus selected for the handover of the at least one third apparatus from the second apparatus.

In an eighth aspect, there is provided a second apparatus. The second apparatus comprises means for independent of a measurement report from at least one third apparatus, receiving, from a first apparatus, handover information indicating at least one fourth apparatus selected for a handover of at least one third apparatus from the second apparatus, the second apparatus serving the at least one third apparatus; and means for transmitting, to the at least one third apparatus, reconfiguration information for configuring the at least one third apparatus to perform a handover from the second apparatus to the at least one fourth apparatus.

In a ninth aspect, there is provided a fifth apparatus. The fifth apparatus comprises means for receiving indication information indicating a change of service availability of a second apparatus, the second apparatus serving at least one third apparatus and being managed by the fifth apparatus; means for determining, based on the indication information, whether the second apparatus is to be replaced; means for, in accordance with a determination that the second apparatus is to be replaced, activating a fourth apparatus to replace the second apparatus in serving the at least one third apparatus; and means for causing further indication information to be transmitted to a first apparatus connected with the second apparatus, the further indication information indicating that the fourth apparatus is to replace the second apparatus in serving the at least one third apparatus.

In a tenth aspect, there is provided a computer readable medium. The computer readable medium comprises program instructions for causing an apparatus to perform at least the method according to any of the fourth aspect, the fifth aspect, and the sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
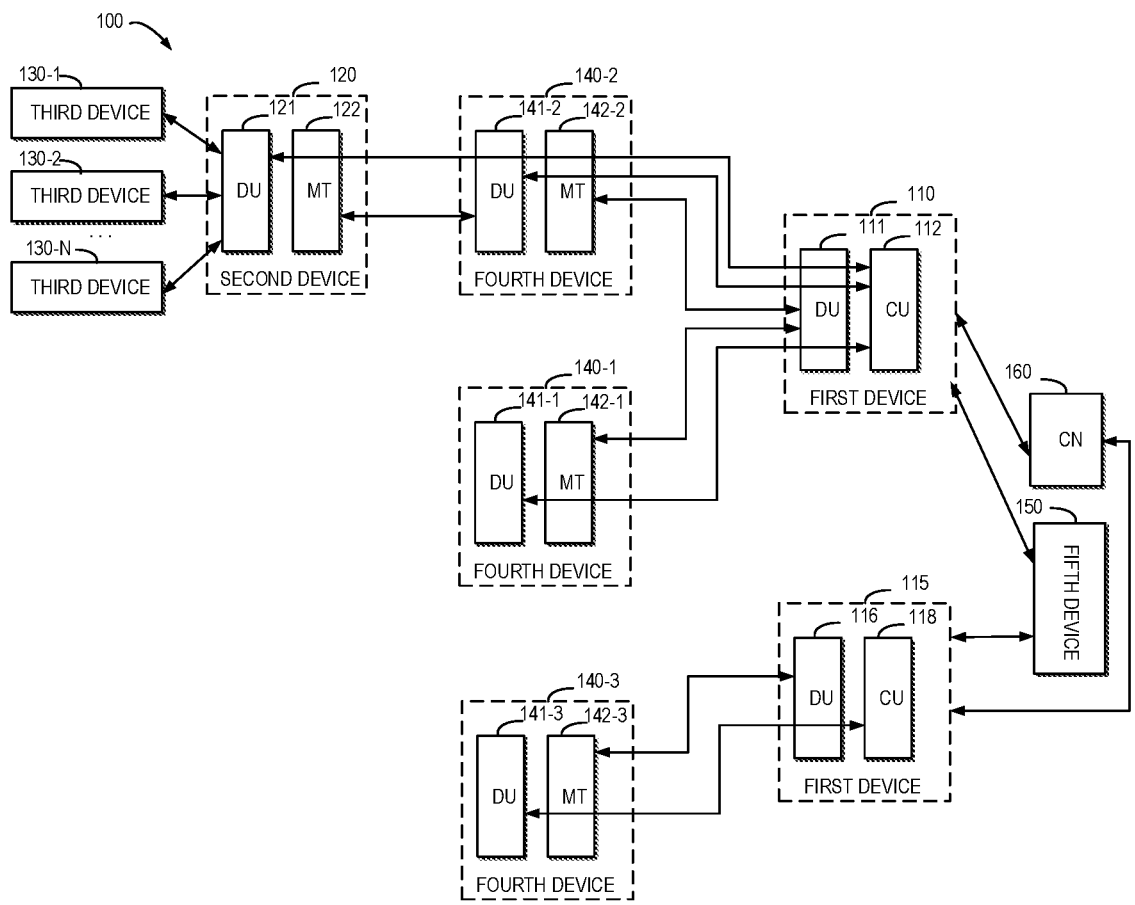
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

Example Environment

In communication systems, deployment of new base stations may be a costly and time consuming effort, including network planning, site acquisition and provision of backhaul connectivity. IAB nodes have been specified to improve coverage and capacity issues in the network, allowing a faster and more flexible deployment of additional base stations with wireless backhaul. FIG. 1 shows an example communication environment 100 in which embodiments of the present disclosure can be implemented. The communication environment 100 illustrates example IAB architecture, including one or more first devices (e.g., first devices 110, 115), a second device 120, one or more third devices (e.g., third devices 130-1, 130-2, . . . , 130-N, where N is an integer larger than or equal to one), one or more fourth devices (e.g., fourth devices 140-1, 140-2, 140-3), and a fifth device 150. For convenience of discussion, the third devices 130-1, 130-2, . . . , 130-N are collectively or individually referred to as third devices 130; and the fourth devices 140-1, 140-2, 140-3 are collectively or individually referred to as fourth devices 140.

In the example of FIG. 1, the first device 110 is illustrated as an IAB donor node (also referred to as IAB-donor), the second device 120 and the fourth devices 140 are illustrated as IAB node (also referred to as IAB-node), and the third devices 130 are illustrated as terminal devices. It is to be understood that the numbers of the first device, second device, third, fourth, and the fifth device are given for the purpose of illustration without suggesting any limitations to the present disclosure. The communication environment 100 may include any suitable number of devices adapted for implementing implementations of the present disclosure.

In the example IAB architecture, the first device 110, as an IAB donor node, serves one or more other devices which may be IAB nodes. For example, the first device 110 serves the second device 120 and the fourth devices 140-1, 140-2; and the first device 115 serves the fourth device 140-3. The IAB donor node and the IAB nodes may be arranged in a hierarchical structure with one or more hops. The terminating hop is the IAB donor node which is connected to the CN 160 by means of backhaul, for example, through an NG interface to the 5G core network (CN). Although not shown, one or more other network devices, such as gNB and eNB, may also be connected to the CN 160. In addition, one or more IAB donor nodes as well as its child IAB nodes may also be connected to the CN 160.

As illustrated, the first device 110 comprises a DU 111 and a CU 112, and the first device 115 comprises a DU 116 and a CU 118. In some example embodiments, the DU 111 has a F1 connection with the CU 112. The DU 111 or 116 serves one or more cells in the same way as DUs with fixed (non-wireless) connection to the CU 112 or 118. The cells served by the DU 111 or 116 may broadcast control signals such as synchronization signal block (SSB) for downlink (DL) synchronization, system information (e.g., master information block (MIB), system information block 1 (SIB1), and the like). Thus, the cell served by the DU 111 may be seen as a normal cell from the UE point of view.

The second device 120 comprises a DU 121 and a MT 122. Similarly, the fourth device 140-1 comprises a MT 142-1 and a DU 141-1, the fourth device 140-2 comprises a MT 142-2 and a DU 141-2, and the fourth device 140-3 comprises a MT 142-3 and a DU 141-3, where the MTs 142-1, 142-2, 142-3 are collectively or individually referred to as MT 142, and DUs 141-1, 141-2, 141-3 are collectively or individually referred to as DU 141. The MTs 122, 142-1, 142-2, 142-3 may behave like terminal devices toward the parent node in the hierarchical structure. The DUs 121, 141-1, 141-2, 141-3 may behave like network devices toward the next-hop IAB nodes, for example, by establishing connections via Uu interfaces. In some example embodiments, the DUs 121, 141-1, 141-2 has a F1 connection with the CU 112 of the first device 110, and the DU 141-3 has a F1 connection with the CU 116 of the first device 115. The DUs 121 and 141 serves one or more cells in the same way as the DUs with fixed (non-wireless) connection to the CU 112. On the access links, the second device 120 and the fourth devices 140-1, 140-2, 140-3 may behave like network devices, providing the radio interfaces (e.g., Uu interfaces) for terminal devices in their coverage areas. Although only the second device 120 is shown to serve the third devices 130, one or more third devices 130 may also be served by the fourth devices 140-1, 140-2, for example, via Uu interfaces. Each DU of the second device 120 and the fourth devices 140-1, 140-2, or the fourth device 140-3 may also connect to the CU 112 or 118 of the first device 110 or 115, for example, via F1 interfaces.

It should be understood that although the DUs, CUs, and MTs are illustrated to be implemented on the respective devices in the example of FIG. 1, each of the DUs, CUs, and MTs may also be implemented on separated entities.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Conventionally, a handover procedure is triggered based on a measurement report from a terminal device during operation. The measurement reports may include signal strengths of the currently serving cell and neighbor cells of the terminal device. If it is determined that the signal strength of the serving cell is decreased and/or if a neighbor cell is found to better serve the terminal device, the terminal device is notified of a handover decision from the serving cell to the neighbor cell. There could be different handover (HO) types, such as baseline HO (BHO), conditional HO (CHO), dual active protocol stack (DAPS) HO, and make-before-break HO.

In the IAB architecture, handover procedures of terminal devices may be triggered from one IAB node toward another IAB node or IAB donor. However, unlike traditional fixed base stations, IAB nodes can be movable. As a specific example, an IAB node may be located on a moving object, such as a bus or train, to provide radio access to terminal devices inside or outside the moving object. This implies that one or more cells provided by the mobile IAB node are "moving". One particular mode of operation of the mobile IAB node is that the IAB node may be active for serving terminal devices located within a certain coverage area when the IAB node is static or slowly moving. Such IAB node can be referred to as nomadic IAB node, which may be considered as a special type of a mobile IAB node. Nomadic IAB nodes can be used to provide coverage and/or capacity enhancement. For instance, a nomadic IAB node may serve the terminal devices outside the vehicle when the vehicle is parked.

However, deploying the IAB nodes in or on moving objects may raise new issues for network planning. The inventors have found that, due to the mobility of the IAB nodes, their availability in a service area may change dynamically, which may be a challenge to the handover management of terminal devices. In a scenario, when a mobile IAB node departs, for example, as a vehicle into which the mobile IAB node is integrated, is driven away, the terminal devices served by the IAB node will experience sudden mobility relative to the IAB node although they may be stationary. In such case, the terminal devices may undergo radio link failures (RLF) and would have to start searching for other proper cells, which implies additional delays and instantaneous signaling increase.

In addition to the mobility, the power supply and the flexible deployment of the IAB nodes may also cause potential sudden service interruption in some cases, which may also lead to the service discontinuity for the served terminal devices. Those sudden changes to the IAB node may be out of the control of the network planning.

According to the conventional handover based on measurement reports from the terminal devices, there is no way for the terminal devices to anticipate when the signal strengths of the serving IAB node will decrease. Thus, there is a high probability that the terminal devices will experience service discontinuity as they cannot be timely transitioned to active cells. It is desired to provide a smooth transition for the terminal devices to new IAB nodes when the serving IAB node becomes unavailable, to attain the service continuity for the terminal devices.

Work Principle and Example Signaling Flow for Handover

According to some example embodiments of the present disclosure, there is provided a solution for handover. In this solution, the handover preparation is anticipated on the network side and can be triggered independent of a measurement report from a terminal device. Specifically, a handover decision is triggered depending on indication information indicating an expected change of service availability of a device (e.g., an IAB node) which serves one or more other devices. As the change of the service availability is indicated before the served device(s) are affected, the handover of the served device(s) can be prepared before the serving device is unavailable and before the served device(s) is affected. The early handover preparation can ensure service continuity of the served devices.

Example embodiments of the present disclosure will be described in detail below with reference to the accompanying drawings.

Figure 2:
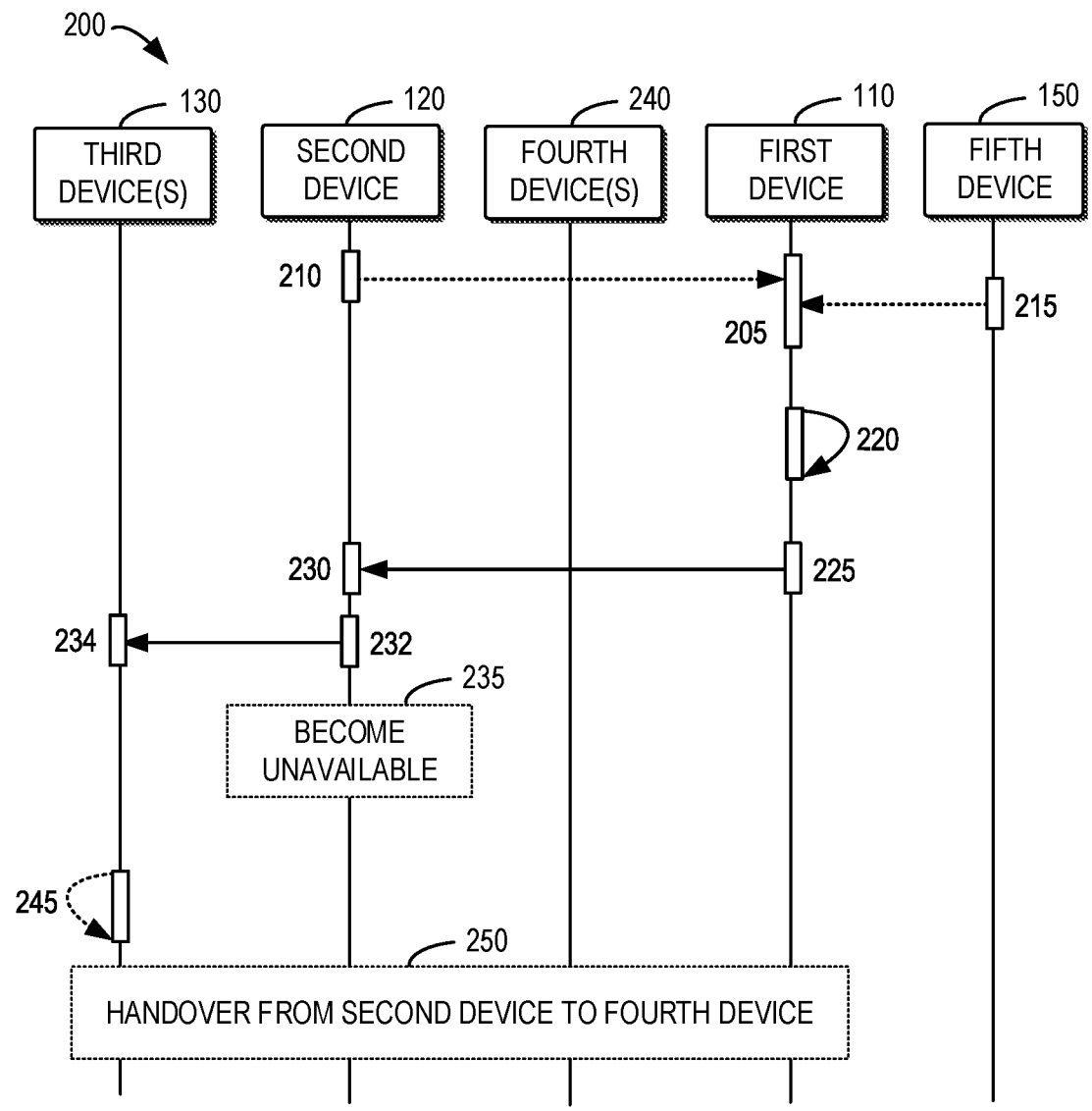
FIG. 2 illustrates a signaling flow for handover of a device(s) according to some example embodiments of the present disclosure.

Reference is now made to FIG. 2, which shows a signaling flow 200 of handover of a device(s) according to some example embodiments of the present disclosure. For the purpose of discussion, the signaling flow 200 will be described with reference to FIG. 1. The signaling flow 200 involves the first device 110, the second device 120, one or more third devices 130 served by the second device 120, one or more fourth devices 240, and the fifth device 150. The fourth device(s) 240 may or may not include the fourth device(s) in the environment 100, which will be discussed in the following.

It would be appreciated that although the signaling flow 200 is described in the IAB-based architecture with the first device 110 as the donor node, the signaling flow 200 is applicable likewise for other first devices such as the first device 115. It would be appreciated that although the signaling flow 200 is described in the communication environment 100 of FIG. 1, this signaling flow may be likewise applied to other communication scenarios.

In the signaling flow 200, the first device 110 is configured for handover control of one or more third devices 130 that are served by the second device 120. In some example embodiments, the first device 110 is an IAB donor node and the second device 120 is an JAB node controlled by the first device 110. In the signaling flow 200, the fifth device 150 is configured for managing the first device 110, the second device 120, and/or the fourth device(s) 240. In some example embodiments of the present disclosure, the fifth device 150 may be a core network entity in the CN 160, such as an access and mobility function (AMF). In some example embodiments of the present disclosure, the fifth device 150 is a management entity, such as an operation administration and maintenance (OAM) entity. In some example embodiments of the present disclosure, the fifth device 150 may obtains assistance information from a positioning entity, e.g., the location management function (LMF), to get information about the physical location of the second device 120.

In operation, the first device 110 receives 205 indication information that indicates a change of service availability of the second device 120. In some example embodiments of the present disclosure, such indication information can be received from a positioning entity.

As will be described below, the indication information is considered as a trigger event to trigger a handover of one or more third devices 130 that are served by the second device 120. In example embodiments of the present disclosure, independent of the measurement reports from the third device(s) 130, a handover decision can be made by directly observing the service availability of the second device 120 on the network side. In some example embodiments, the indication information may indicate whether the second device 120 is about to become unavailable for serving some or all of the third devices 130.

In some example embodiments, the indication information may be provided to the first device 110 earlier than the measurement reports from the third devices 130 that trigger the handover decision. As such, although there is no radio condition to trigger a handover of the third device(s) 130, such indication information can be used proactively to move the third device(s) 130 from the second device 120, which is to become unavailable, to a new device which is available for serving the third device(s) 130.

The second device 120 may become unavailable in serving one or more third devices 130 for various reasons and thus the indication information may indicate how the service availability is changed from various sources (e.g., different devices/entities). Some example embodiments will be described in the following.

In some example embodiments, the indication information may comprise information indicating that the second device 120 is to move out of a service area for the third device(s) 130. In some example embodiments, the second device 120 may be movable, for example, a mobile IAB node or specifically, a nomadic IAB node. In some example embodiments, the second device 120 may be a node with wireless backhaul, for example, a mobile or nomadic relay.

The mobility of the second device 120 may be caused by mobility of an object into which the second device 120 is integrated. For example, the second device 120 may be integrated in a vehicle, e.g., of a car sharing fleet or a taxi fleet. Currently, vehicles with their battery or dynamo can serve as a flexible and largely available resource for deploying IAB nodes. Owners of larger fleets of vehicles, i.e. buses, taxis or rental cars, may offer their vehicles as a hosting platform or even operate IAB nodes by themselves. In this case, the departing of the vehicle may cause the second device 120 to be moved. Of course, the second device 120 may be located in other movable objects such as a bus, a train, an unmanned aerial vehicle (UAV), and the like, and thus may move with them. In other examples, the second device 120 may be portable and moved by its owner.

Due to the mobility of the second device 120, the service area provided by the second device 120 may be moving as the second device 120 moves, resulting in service unavailability for some third device(s) 130 located in the original coverage area. Thus, providing the information indicating the movement proactively to the first device 110 may help the first device 110 to make a handover decision for the third device(s) 130.

The information indicating the movement may be provided to the first device 110 before the second device 120 starts moving or soon after the second device 120 moves during which the third device(s) 130 may not detect a significant decrease in the signal strength from the second device 120 in their measurement report(s).

In some example embodiments, the first device 110 may receive 205, from the second device 120, the information indicating the movement of the second device 120. As illustrated in FIG. 2, the second device 120 may transmit 210 the indication information to the first device 110 which comprises the information indicating the movement of the second device 120. In some example embodiments, the information may be transmitted by the MT 122 of the second device 120 to the first device 110.

The second device 120 may be aware of when its service availability is to be changed, for example, due to its movement or battery level. In some example embodiments, one or more indications of movement of an object into which the second device 120 is integrated may be provided to the second device 120. Application systems may be running on the object to provide such indications. For example, a motion sensor system positioned together with the second device 120, a change of position indicated from a location system or service (e.g., a global position system (GPS) or a 5G location service), and/or a status change of the onboard navigation system may be used as indications of the movement of the second device 120. In some example embodiments, the second device 120 may be equipped with a motion sensor to detect its movement.

Alternatively, or in addition, the information indicating the movement of the second device 120 may be provided by a third-party entity monitoring mobility of an object positioned in association with the second device 120. For example, if the second device 120 is mounted in a vehicle, application systems such as a motion sensor system, a positioning system, or a navigation system in a vehicle may monitor whether the vehicle is moved. The motion sensor system, the positioning system, the auto-driving system, or the navigation system may provide the indication of the movement of the vehicle (which directly indicates the movement of the second device 120) to the first device 110. In some cases, some application systems may be developed to monitor the status of the object into which the second device 120 may be integrated. For example, a car renting application system may inform that the vehicle is booked by a customer or the engine of the vehicle is started.

In some example embodiments, the information indicating the movement of the second device 120 may be informed to the fifth device 150, which may then forward the information to the first device 110. As illustrated in FIG. 2, the fifth device 150 may transmit 215 the indication information to the first device 110 which comprises the information indicating the movement of the second device 120.

The CN 160 or the network management plane may have exposure functions that can obtain such information from the third-party entity monitoring mobility of an object positioned in association with the second device 120. The fifth device 150 (for example, an OAM entity in the management plane or domain or a core network entity in the CN 160) may transmit the information indicating the movement to the first device 110. Examples of the entity monitoring the mobility may include a motion sensor system, a positioning system, or a navigation system in a vehicle, other application systems developed to monitor the status of the object into which the second device 120 may be integrated.

In some example embodiments, in addition to the information indicating the movement or as an alternative, the indication information to be used as a trigger event for the handover may comprise information indicating that the second device 120 is to be failed. The second device 120 may become unavailable for serving a third device 130 due to hardware failure, software failure, and/or the like. The information indicating the failure may be transmitted to the first device 110 from the second device 120 at 210, or from the fifth device 150 at 215 in the signaling flow, or by any third-party entity (such as an application system) that monitors the operating state of the second device 120.

Alternatively, or in addition, in some example embodiments, the indication information may comprise information indicating that the second device 120 is to be deactivated. The deactivation of the second device 120 may be caused due to the second device 120 being turned off, a battery drain of the second device 120, and/or other reasons. In an example, a user-initiated switch on a dashboard for opting-in/out from service may control activation and deactivation of the second device 120. As another example, the deactivation of the second device 120 may be triggered based on an expiration of a timer, and/or any other events. In some example embodiments, the DU 121 and the MT 122 of the second device 120 may be both deactivated. Alternatively, in some example embodiments, the deactivation of the second device 120 means deactivation of the DU 121 part of the second device 120 while the MT 122 part remains active and maintains connection to the network. This may imply that only the served cell(s) are turned off but the MT 122 keeps the connection to the network to allow possible later (re-) activation of the DU (e.g., in another location).

A third-party entity (such as an application system) may monitor the operating state of the second device 120 or the energy status of a power supply to the second device. Such entity may be able to provide the information indicating the deactivation if it detects that the second device 120 is to be deactivated or to terminate its service. The information indicating the deactivation of the second device 120 may be provided by the application system to the second device 120 or the fifth device 150 which may in turn report it to the first device 110. In some other examples, the application system may also transmit the information indicating the deactivation to the second device 120 if possible.

Alternatively, or in addition, in some example embodiments, the indication information may comprise information indicating that one or more other devices are configured to replace the second device 120 in serving one or more third devices 130. A device configured to replace the second device 120 is also referred to as a fourth device. In the case of receiving the information indicating the replacement, a fourth device may be a new device (not shown in FIG. 1) that is added to the IAB-based architecture, for example, the one illustrated in FIG. 1. In some example embodiments, the fourth device(s) 240 may comprise a new device that is activated to replace the second device 120, which will be described in detail below with reference to FIGS. 3 and 4. In some other example embodiments, the fourth device(s) 240 may comprise a new device that is connected with a different IAB donor node.

In some example embodiments, the decision on replacing the second device 120 with one or more other devices may be made by the fifth device 150. The fifth device 150 may decide to replace the second device 120 for the purpose of network planning and management. The detailed discussion about making a decision to replace the second device 120 will be provided in the following with reference to FIG. 3 and FIG. 4.

In some example embodiments, upon determining to replace the second device 120, the fifth device 150 may transmit the corresponding indication information to the first device 110. Alternatively, the one or more fourth devices, which are configured to replace the second device 120, may transmit the corresponding indication information to the first device 110. In some example embodiments, the fifth device 150 may indicate to the second device 120 that it is to be replaced by one or more fourth devices and the second device 120 may transmit the corresponding indication information to the first device 110.

In some example embodiments, the second device 120, e.g., the MT 122 of the second device 120, may detect one or more new neighbor cells that provide strong signal strengths, for example, after one or more fourth devices are activated. The second device 120 may transmit a measurement report to the first device 110 to indicate the signal strength with the one or more fourth devices. The first device 110 may anticipate, from the information indicating the movement, failure, or deactivation, that the serving second device 120 is about to depart or deactivate. Thus, the first device 110 may assume that the one or more third devices 130 currently served by the second device 120 may also have a strong reception of the new neighbor cell(s) of the one or more fourth devices. In this case, the measurement report of the MT 122 may also be used as indication information to indicate that when the service availability of the second device 120 is changed there are one or more suitable devices for serving one or more third devices 130 in the vicinity of the position of the second device 120.

In the example embodiments discussed above, various types of indication information are provided to be used as trigger events for the handover. Depending on the types of the indication information, the indication information may be provided from various sources to the first device 110 to trigger the handover. As mentioned, the various sources may include the second device 120 and the fifth device 150 (as illustrated in the signaling flow 200), an entity monitoring mobility of an object positioned in association with the second device 120, and/or the device(s) which are configured to replace the second device 120. Some other sources for the indication information will be further discussed in the following.

Upon receiving the indication information indicating the change of the service availability of the second device 120, the first device 110 determines 220, based on the indication information, whether a handover of the third device(s) 130 from the second device is to be triggered. In some example embodiments, the CU 112 of the first device 110 may use the indication information to make the handover decision.

If the indication information indicates that the service availability becomes or will become unavailable for one or more third devices 130, the first device 110 determines that a handover of the third device(s) 130 from the second device 120 is to be triggered. In this case, the first device 110 transmits 225, to the second device 120, handover information indicating at least one fourth device 240 selected for the handover of the third device(s) 130 from the second device 120. It is noted that at this point, in most cases, there will be no trigger for a legacy handover for the served third device(s) 130, which would be triggered based on the measurement report(s) from the served third device(s) 130.

In some example embodiments, if the second device 120 is to move out of a coverage area, as indicated by the indication information, the first device 110 may determine to trigger handovers for all the third devices 130 located in that coverage area. In some example embodiments, if the second device 120 is to be failed or deactivate, as indicated by the indication information, the first device 110 may determine to trigger handovers for all the third devices 130 that are currently served by the second device 120.

In some example embodiments, if the second device 120 is to be totally replaced by one or more fourth devices, as indicated by the indication information, handovers for all the third devices 130 may be triggered. In some cases, the indication information may indicate that the one or more fourth devices are configured to replace the second device 120 in serving some but not all of the third devices 130, for example, in order to mitigate high local network load for the second device 120. In such case, the handovers for the indicated third device(s) 130 may be triggered by the first device 110.

In some example embodiments, upon determining to trigger a handover of the third device(s) 130, the first device 110 may select one or more fourth devices 240 as a target(s) for the handover. In an example embodiment, the fourth device(s) 240 selected as a target(s) for the handover of the third device(s) 130 may include one or more fourth devices 140 that are controlled and served by the first device 110. In other words, among all candidate devices, the first device 110 may select one or more fourth devices 140 (e.g., the fourth device 140-1, 140-2) that are connected therewith and of course, available for serving the third device(s) 130. By selecting the fourth device(s) 140 connected with the same first device 110 as the second device 120, an intra-CU handover of the third device(s) 130 may be executed between IAB nodes, which may cause less signaling overhead during the handover procedure.

In an example embodiment, the first device 110 may also determine one or more fourth devices (e.g., IAB nodes) controlled by other devices (such as a different IAB donor node) for the handover. For example, if no such available fourth device connected to the first device 110 is found, the first device 110 may determine the fourth device(s) controlled by another first device. In the communication environment 100 of FIG. 1, the first device 110 may select the fourth device 140-3 which is connected to the other first device 115 as a target for the handover. In this case, an inter-CU handover of the third device(s) 130 may be executed. In some example embodiments, the fourth device(s) 240 selected as a target(s) for the handover of the third device(s) 130 may comprise a static network device, such as a gNB or an eNB.

In some example embodiments, the first device 110 may receive one or more measurement reports from the third device(s) 130 which can be used to determine the appropriate fourth device(s) 240 for the handover. The measurement report(s) from the third device(s) 130 may indicate a signal strength(s) with one or more neighbor cells served by other devices than the second device 120. In some example embodiments, the first device 110 may receive one or more measurement reports from the second device 120, e.g., from the MT 122 of the second device 120, which indicate a signal strength(s) between the cell(s) served by the second device 120 and one or more neighbor cells served by other devices than the second device 120. According to the measurement repot(s), the first device 110 may select one or more fourth devices 240 from those devices with strong signal strengths. Alternatively, or in addition, proximity information of other available devices relative to the second device 120 may be used to select an appropriate fourth device. For example, the first device 110 may select a fourth device 240 that is close to the second device 120.

In some example embodiments, if the handover for the third device(s) 130 is triggered by the information indicating the replacement, the first device 110 may determine the one or more fourth devices 240 as the one(s) indicated in the information to replace the second device 120.

In some example embodiments, a plurality of fourth devices 240 may be selected for a third device 130 to perform the handover. The decision for the best target device for a handover is left to the third device 130, for example, if CHO is to be executed at the third device 130. In this embodiment, for at least some of the third devices 130, multiple handover preparations may be executed by selecting a plurality of fourth devices 240.

In some example embodiments, multiple third devices 130 may be spread out in the coverage area and thus not all the third devices 130 will have the same radio conditions with the same fourth device(s) 240. Therefore, in some example embodiments, the first device 110 may select a plurality of groups of fourth devices 240 for the third devices 130, each group of fourth devices 240 being selected for a handover of at least one third device 130. As such, for a subset of the third devices 130, one or more suitable fourth devices 240 may be selected.

The first device 110 may perform handover preparation to the selected fourth device(s) 240. Specifically, if the intra-CU handover is to be executed, for example, if the fourth device(s) 140 is selected as the target fourth device(s) 240, the first device 110 may transmit a UE context set-up request to the fourth device(s) 240, to exchange the context of the third device(s) 130. If the first device 110 selects the fourth device(s) 240 for more than one third device 130, a group UE context set-up request may be transmitted to the fourth device(s) 240. In some examples, the triggered handover may be conditional handover (CHO). In this case, the UE context set-up request to the fourth device(s) 240 may be a conditional UE context set-up request. The fourth device(s) 240 may transmit a UE context set-up response (for example, a group UE context set-up response) to the first device 110, to acknowledge the UE context set-up request. The UE context set-up request and UE context set-up response may be exchanged via an F1 interface between the CU 112 of the first device 110 and the DU 141 of the fourth device(s) 140.

In some example embodiments, if the inter-CU handover is to be executed or if the static network device such as a gNB or eNB is selected as the target fourth device(s) 240, the message exchange related to the handover preparation may be performed via an Xn interface. Specifically, the first device 110 may transmit, to the fourth device(s) 240, a handover request across Xn interface with exchange of context of the third device(s) 130. The fourth device(s) 240 may provide a resource allocation decision signaled in the handover request acknowledgment.

In the case that the fourth device(s) 240 is selected and prepared, the first device 110 may transmit the handover information to the second device 120 at 225. In some example embodiments, the handover information may be transmitted in a Group UE context modification Request (e.g., an RRCReconfiguration message) with identities of the fourth device(s) 240 included therein. The identities of the fourth device(s) 240 may comprise cell identities of the fourth device(s) 240. The handover information may be transmitted from the CU 112 of the first device 110 to the DU 121 of the second device 120, for example, via a F1AP procedure.

Upon receiving 230 the handover information from the first device 110, the second device 120 may transmit 232, to the third device(s) 130, reconfiguration information for configuring the third device(s) 130 to perform a handover from the second device 120 to the fourth device(s) 240. In some example embodiments, the reconfiguration information may include an RRCReconfiguration message for a handover. In some example embodiments, the reconfiguration information is for CHO, and may include an RRCReconfiguration message for CHO. The reconfiguration information may comprise identities of the fourth device(s) 240, such as cell identities of the fourth device(s) 240. By receiving 234 the reconfiguration information from the second device 120, the third device(s) 130 may be reconfigured to initiate a handover.

In some example embodiments, there might be a HO reason information element (IE) provided to the third device(s) 130 that this is a second device induced HO, e.g., an IAB induced HO. The HO IE may be included in the reconfiguration information transmitted by the second device 120 to the third device(s) 130. According to the HO IE, the third device(s) 130 may determine that the HO is triggered by the second device 120 due to its service unavailability, not by the measurement report(s) sent by the third device(s) 130.

In some example embodiments, the second device 120 may also transmit a response to the handover information from the first device 110. For example, the response may comprise a Group UE context modification response.

The second device 120 may become unavailable at 235, for example, due to the mobility, failure, deactivation, or switching off of its serving cell(s) or turning down its transmit power as it is replaced by the fourth device(s) 240. In the case of CHO, the service unavailability of the second device 120 may enable fulfilment of a handover condition at the third device(s) 130. The third device(s) 130 determines 245 whether a handover condition with respect to a fourth device 240 is fulfilled. If a handover condition with respect to a fourth device 240 is fulfilled, the third device(s) 130 executes 250 a handover from the second device 120 to the fourth device 240. In other examples than the CHO case, the third device(s) 130 may directly execute the handover upon receiving the handover information, without monitoring the handover condition. The handover procedure may involve the third device(s) 130, the second device 120, the first device 110, and the fourth device 240.

In some example embodiments, for a third device 130, if more than one fourth device 240 is prepared for its handover, the third device 130 may perform CHO to determine which one is to move to. Thus, different third devices 130 may select different fourth device 240 to perform the handover. A third device 130 may monitor multiple conditions and the first fulfilled CHO condition may determine with which fourth device 240 the third device 130 will execute the handover procedure at 250. Such embodiment will reserve resources in several fourth devices 240, including their DU and CU parts. Thus, the completion of the handover procedure may trigger a clean-up of now obsoleted CHO conditions in the third device 130 and handover preparations in the remaining fourth device(s) 240.

In some scenarios, if handovers for a large number of third devices 130 are triggered and executed almost at the same time, the signaling storm incurred from the handover requests of the large number of third devices 130 can cause an overload to the network. In some example embodiments, it is desired that the fulfillment of the handover conditions for the third devices 130 is spread out over time. This can be achieved by gradually ramping down transmit power of the second device 120, which may trigger fulfillment of handover conditions configured for the third devices 130 gradually over a relatively long period of time. In some other examples, if the second device 120 (and potential child nodes in the IAB-based hierarchical structure) provides a plurality of serving cells, it may switch off its serving cells one by one, which may trigger the fulfillment of handover conditions for different sub-sets of third devices 130 in the serving cells one by one. By extending the period of time during which the fulfillment of handover conditions is triggered, the second device 120 may maintain active to serve some third devices 130 (for examples, the third devices 130 located around the second device 120 as it moves away from its former position). The handover condition of the served third devices 130 is fulfilled when the second device 120 moves out of a certain range. Thus, it mitigates the signaling storm for the second device 120 and the handover interruption time for the third devices 130.

It is noted that such handover mechanism can still be considered different from the legacy handover, because the fourth device(s) 240 has been prepared anticipatorily. In some example embodiments, where the second device 120 is ramping down the Tx power the target fourth device(s) may ramp up its Tx power. Here, a fourth device may be a new one that can ramp up Tx power or an existing one which is operating below the maximum allowed Tx power. In such cases, there could be some coordination needed to sync the second device 120 and the fourth device(s) 240, where such coordination could be performed via F1 interface or via Xn interface. In some example embodiment, in the case that the second device 120 is to be deactivated, the second device 120 can be barred for new third devices (e.g., UEs).

In some example embodiments, as an alternative to mitigate the potential signaling storm or additionally, the first device 110 may control the handover preparation for different sub-sets of third devices 130. For example, if the first device 110 selects a plurality of groups of fourth devices 240 for different sub-sets of third devices 130, the handover preparation of the fourth devices 240 may be performed several times for different groups of fourth devices 240 and as a result, the reconfiguration information may be transmitted toward different sub-sets of third devices 130 for multiple times. The handover of some sub-sets of the third devices 130 may be delayed in order to avoid simultaneous execution of the handover procedures. In some examples, the handover preparation of the fourth devices 240 as well as the following operations may even be performed individually for the third devices 130, to cause the third devices 130 to execute the handover procedure one by one.

It would be appreciated that the various types of indication information as described herein may be used as additional event triggers for the handover. That is, during operation, the first device 110 may also obtain measurement reports from the third device(s) 130 to determine whether a handover of the third device(s) 130 is required. If one or more of the measurement reports indicate a decrease of a signal strength with the second device 120, a handover of the third device(s) 130 may also be triggered. Independent of the measurement report indicating a decrease of a signal strength with the second device 120, in some example embodiments of the present disclosure, the indication information indicating an anticipated service unavailability of the second device 120 may also be used as an trigger event to the handover of the third device(s) 130.

According to the indication information indicating the service unavailability of the second device 120, the semantics of the handover preparation at the first device 110 may be different than the legacy handover which is based on the measurement reports from the third device(s) 130. The third device(s) 130 may not be aware that the handover is not based on their measurement reports. The third device(s) 130 may perform the handover procedure in the same or similar way. However, the indication information indicating the service unavailability of the second device 120 can trigger the handover even before the third device(s) 130 senses a change in the radio condition with the second device 120. In this way, the service continuity of the third device(s) 130 can be guaranteed if the second device 120 suddenly moves, fails, deactivates, and is replaced by a new device.

Example Environment for Device Replacement

Figure 3:
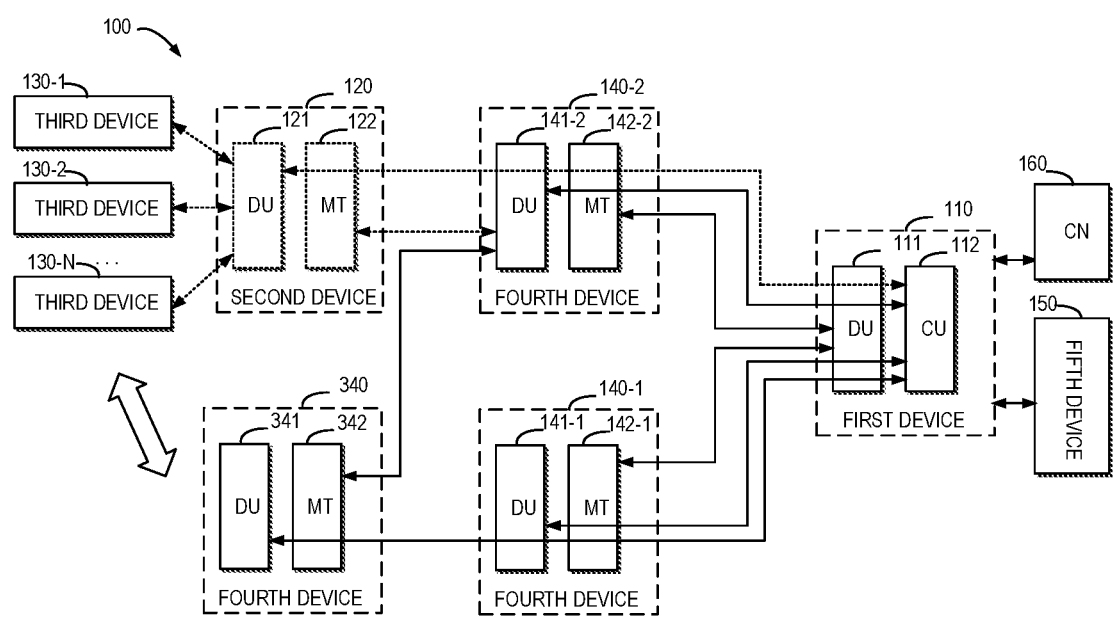
FIG. 3 illustrates another example communication environment in which example embodiments of the present disclosure can be implemented.

As mentioned above, in some cases, one or more devices may be configured to replace the second device 120 in serving the third device(s) 130. This can be related to the network planning and management. FIG. 3 illustrates another example communication environment 100 in which example embodiments of the present disclosure can be implemented. In the example illustrated in FIG. 3, a new device 340 (referred to as a fourth device 340) is activated to replace the second device 120. In such case, the one or more third devices 130 served by the second device 120 may be moved to the fourth device 340 (or other available devices). The fourth device 340 may also be an IAB node which comprises a DU 341 and a MT 342, similar to the DU 121 and the MT 122 comprised in the second device 120. The MT 342 may be connected to the DU 141-1 of the fourth device 140-1 to replace the MT 122 of the second device 120, and the DU 341 may be connected to the CU 112 of the first device 112 to replace the DU 121 of the second device 120.

Typically, each cell in the communication system is configured, e.g., based on network planning with a Physical Cell ID (PCI) to distinguish cells on the radio side. A PCI has a pseudo-unique value (504 values in LTE and 1008 in NR) which requires a re-use within the network, and consequently the same values should not be used for radio cell located near to each other. The communication systems support an exchange of PCI between network devices via the X2/Xn interface. Based on this exchange, a Neighbor Relation Table (NRT)/Neighbor Cell Relation table (NCRT) is set up within each network device. In traditional solutions, the change of the network planning (e.g., placing a new device (e.g., an IAB node)) generally reacts slowly to the handover scenarios.

According to some example embodiments of the present disclosure, the fifth device 150 is configured to activate one or more fourth devices (e.g., the fourth device 340) in the case that it becomes aware of a change of the service availability of the second device 120. As such, the activated fourth device 340 may be used to replace the second device 120 serving the third device(s) 130. A handover of the third device(s) 130 may be triggered from the second device 120 to the fourth device 340.

Example Signaling Flow for Device Activation and Handover

Figure 4:
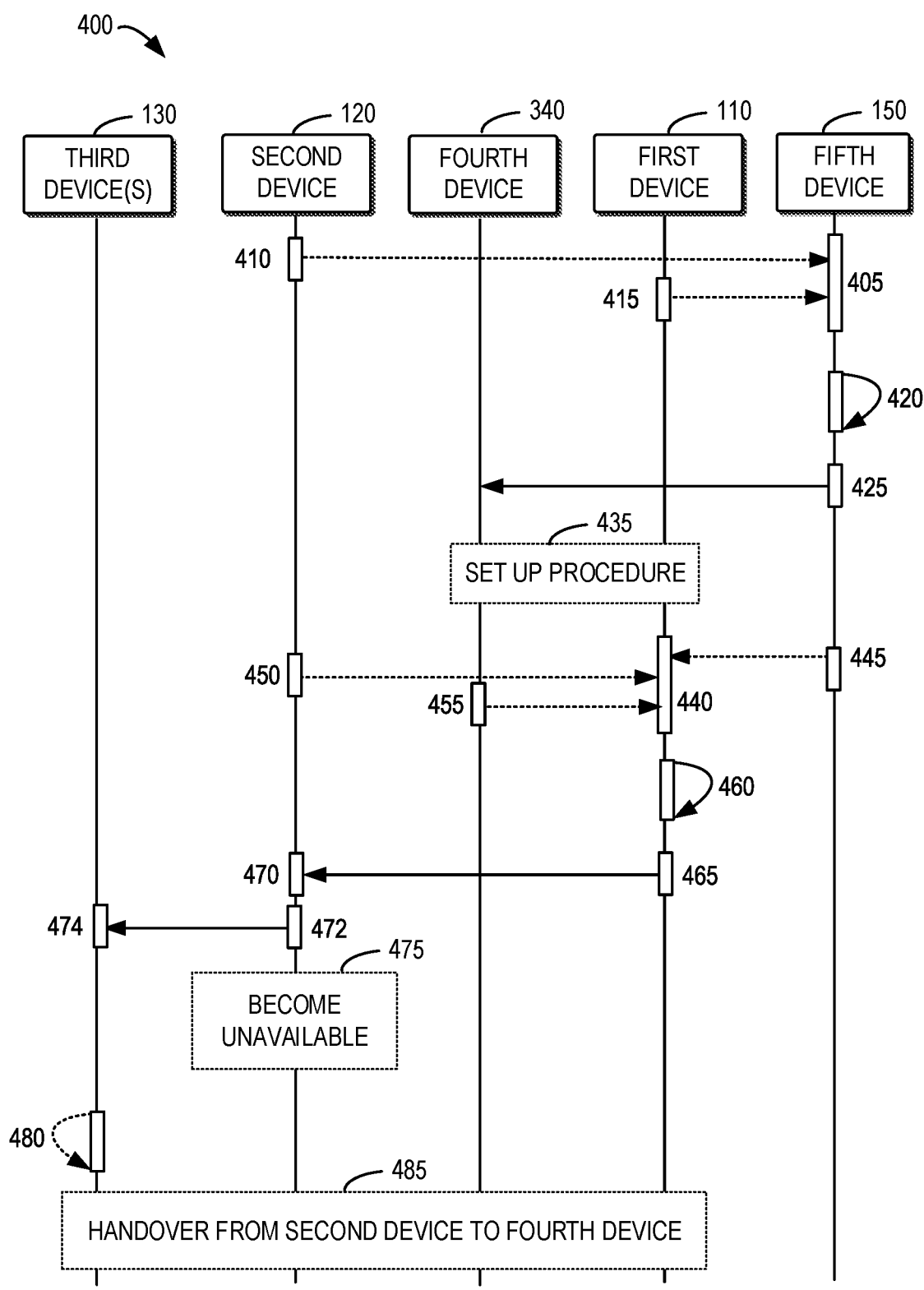
FIG. 4 illustrates a signaling flow for activating a new device according to some example embodiments of the present disclosure.

To better illustrate such example embodiments, reference is now made to FIG. 4 which shows a signaling flow 400 of activation of a fourth device and a handover of a third device(s) according to some example embodiments of the present disclosure. For the purpose of discussion, the signaling flow 400 will be described with reference to FIG. 3. The signaling flow 400 involves the first device 110, the second device 120, one or more third devices 130 served by the second device 120, the fourth devices 340, and the fifth device 150.

In operation, the fifth device 150 receives 405 indication information that indicates a change of service availability of the second device 120. The indication information may be similar to some indication information that is reported to the first device 110 to trigger the handover as discussed above. In some example embodiments, the indication information may comprise the information indicating that the second device 120 is to move out of a service area for the at least one third device 130, information indicating that the second device 120 is to be failed, information indicating that the second device 120 is to be deactivated, and/or other useful information. A part or all of the indication information used by the fifth device 150 may be transmitted 410 from the second device 120 or transmitted 415 from the first device 110, as discussed above.

The fifth device 150 determines 420, based on the indication information, whether the second device is to be replaced. In some example embodiments, if the fifth device 150 determines that one or more third devices 130 may be moved from the second device 120 due to the high local network load, the fifth device 150 may also determine that the second device 120 should be set as unavailable for serving the one or more third devices 130 and an additional fourth device 340 may be activated to replace the second device 120 in serving the specific third device(s) 130.

If the fifth device 150 determines that the second device 120 becomes unavailable in serving one or more third devices 130, for example, due to the movement, failure, deactivation, or other reasons, the fifth device 150 activates 425 the fourth device 340 to replace the second device 120 in serving the third device(s) 130. For example, the fifth device 150 may configure the fourth device 340 with a PCI. In some example embodiments, although one fourth device 340 is illustrated, the fifth device 150 may determine two or more fourth devices 340 to replace the second device 120, each fourth device configured for service a subset of the third devices 130.

In some example embodiments, the fifth device 150 may prepare a list of possible candidate devices for replacing the serving devices (e.g., mobile IAB nodes) and/or may hold a map of positions of available passive candidate devices which can be activated. The devices (e.g., IAB nodes) may be available for offering service in various scenarios, for example, when a vehicle is being parked (ignition off and not moving for a certain range), when a rental vehicle is returned, when a manual switch indicates that a vehicle is now offering service as an IAB node, a vehicle approaches a position where communication service is needed (this need may be broadcasted by the network or available in an application server), and the like. In some further examples, some autonomous vehicles may receive the request for activating its service and actively move without a driver to a target position where the service is needed. In some examples, vehicles may inform the fifth device 150 that they are willing to offer communication service, so that the fifth device 150 may add the vehicles to the list of candidate devices that can be activated. It is noted that although vehicles are used as examples here, other entities with the IAB nodes integrated therein may also provide for the fifth device 150 the indication of a willing to offer service.

In some example embodiments, the fifth device 150 may determine, among the candidate devices, the target fourth device 340 to be activated based on proximity information between the fourth device 340 and the second device 120. If the fourth device 340 locates near the second device 120, the fifth device 150 may determine to activate this device. In some example embodiments, if the measurement report(s) are transmitted from the second device 120, the fifth device 150 may perform a more accurate decision on selecting the fourth device 340 to replace the second device 120.

If the fourth device 340 is activated, a set up procedure may be performed 435 between the first device 110 and the fourth device 340. As such, the fourth device 340 may be added into the IAB-based hierarchical structure, for example, by connecting its MT 342 to the DU 141-1 of the fourth device 140-1 and connecting the DU 341 to the CU 112 of the first device 110. The fourth device 140 may thus be controlled by the first device 110.

Still referring to the signaling flow 400 in FIG. 4, the fifth device 150 causes further indication information to be transmitted to the first device 110, to indicate that the fourth device 340 is to replace the second device 120 in serving the third device(s) 130. The further indication information is used as (at least a part) of the above-mentioned indication information used by the first device 110 as a trigger event to trigger a handover of the third device(s) 130. The first device 110 receives 440 the further indication information.

In some example embodiments, the fifth device 150 may transmit 445 the further indication information to the first device 110. In some example embodiments, the first device 110 may receive the information on the fourth device 340 during the set up procedure at 435 or may be informed by the fifth device 150. In some example embodiments, the second device 120 may transmit 450, to the first device 110, the further indication information indicating that the fourth device 340 is to replace the second device 120 in serving the third device(s) 130. In this case, the second device 120 may be informed of the replacement by the fifth device 150. Alternatively, the fourth device 340 may transmit 455 the further indication information to the first device 110 after it is activated by the fifth device 150 to replace the second device 120.

The first device 110 receives 440 the further indication information from the fifth device 150, the second device 120, and/or the fourth device 340, and possible other indication information indicating a change of the service availability of the second device 120, to determine whether a handover of the third device(s) 130 is to be triggered. In the following, operations at 460, 465, 470, 472, 474, 475, 480, 485 in the signaling flow 400 are respectively similar to the operations at 220, 225, 230, 232, 234, 235, 245, and 250 in the signaling flow 200 of FIG. 2, the description of which is omitted for the purpose of brevity.

In some example embodiments, in triggering the handover of the third device(s) 130, capacity enhancement and coverage enhancement use cases may be differentiated. In an example embodiment, the second device 120 may be deployed for coverage enhancement. In this use case, if the service of the second device 120 becomes unavailable, a new device may be deployed, for example to replace the second device 120 in providing the coverage enhancement. For example, a new device, i.e., the fourth device 340 in the example of FIG. 3, may be activated by the fifth device 150 to replace the second device 120. In such case, upon receiving the information indicating the replacement, the first device 110 may determine to handover all the third devices 130 served by the second device 120 to the fourth device 340. The third devices 130 may not need to provide measurement reports to the first device 110 to determine which fourth device is appropriate for the handover.

In an example embodiment, the second device 120 may be deployed for capacity enhancement. Thus, if the service of the second device 120 becomes unavailable or insufficient, some or all of the third devices 130 may be handed over to different neighbor cells provided by the fourth devices. In this case, the third devices 130 may transmit measurement reports to determine which neighbor cells can provide better service for the individual third devices 130. The first device 110 may determine different fourth devices for different third devices 130

In some example embodiments, the fifth device 150 may provide, to the first device 110, information on how to differentiate the two use cases. In some example embodiments, the first device 110 may determine the use case for the second device 120, for example, based on one or more measurement reports received from the third devices 130 during the operation of the second device 120. Such UE-based rating of the use case may be considered in the first device 110 or in the fifth device 150 when deciding about activation of a device for replacement or deactivation of a device that is no longer needed.

Example Methods Implemented at Devices

Figure 5:
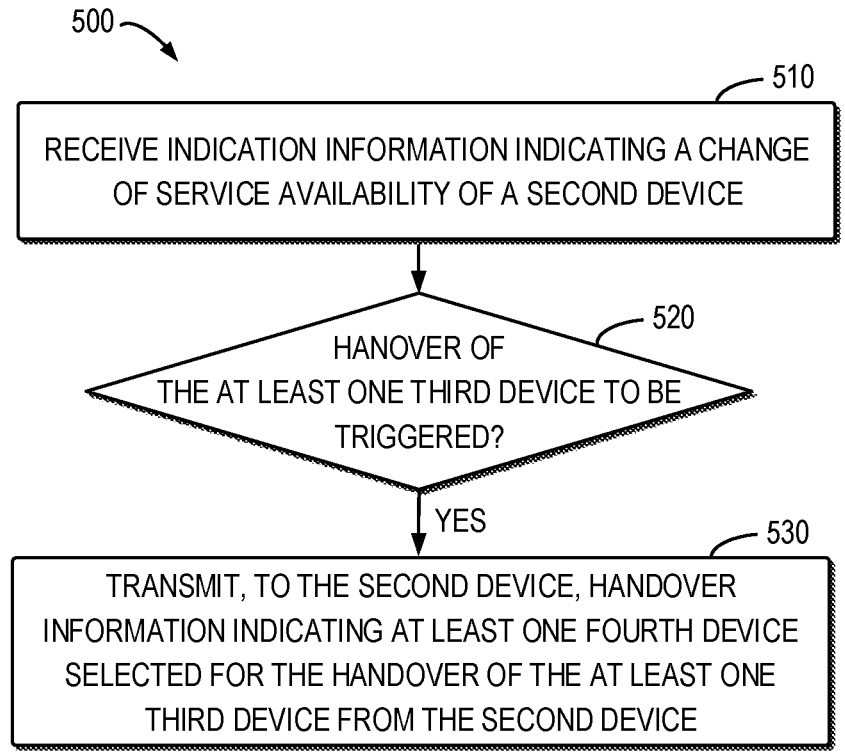
FIG. 5 illustrates a flowchart of a method implemented at a first device according to some other example embodiments of the present disclosure.

FIG. 5 shows a flowchart of an example method 500 implemented at a first device in accordance with some example embodiments of the present disclosure. For the purpose of discussion, the method 500 will be described from the perspective of the first device 110 with respect to FIG. 1 and FIG. 4.

At block 510, the first device 110 receives indication information indicating a change of service availability of a second device, the second device serving at least one third device.

In some example embodiments, the indication information comprises at least one of the following: information indicating that the second device is to move out of a service area for the at least one third device, information indicating that the second device is to be failed, information indicating that the second device is to be deactivated, or information indicating that the at least one fourth device is configured to replace the second device in serving the at least one third device.

In some example embodiments, the first device 110 receives at least part of the indication information from at least one of the following: the second device, an entity monitoring mobility of an object positioned in association with the second device, a fifth device configured for managing the second device, and the at least one fourth device.

At block 520, the first device 110 determines, based on the indication information, whether a handover of the at least one third device from the second device is to be triggered.

In some example embodiments, the first device 110 determines, independent of a measurement report from the at least one third device, and based on the indication information, that a handover of the at least one third device from the second device is to be triggered.

At block 530, if the handover of the at least one third device is to be triggered, the first device 110 transmits, to the second device, handover information indicating at least one fourth device selected for the handover of the at least one third device from the second device. In some example embodiments, if the first device 110 determines that the handover of the at least one third device 130 is not to be triggered, it may wait for subsequent indication information to make the handover decision.

In some example embodiments, the first device 110 selects, from a plurality of candidate devices, at least one fourth device connected with the first device and available for serving the at least one third device.

In some example embodiments, there may be plurality of third devices. In some example embodiments, the first device 110 selects a plurality of groups of fourth devices for the plurality of third devices, each group of the plurality of groups of fourth devices being selected for a handover of at least one of the plurality of third devices from the second device.

In some example embodiments, the at least one fourth device comprises a new device activated to replace the second device.

In some example embodiments, the first device comprises an integrated access and backhaul donor node. In some example embodiments, the second device and the at least one fourth device comprise integrated access and backhaul nodes. In some example embodiments, the at least one third device comprises at least one terminal device.

Figure 6:
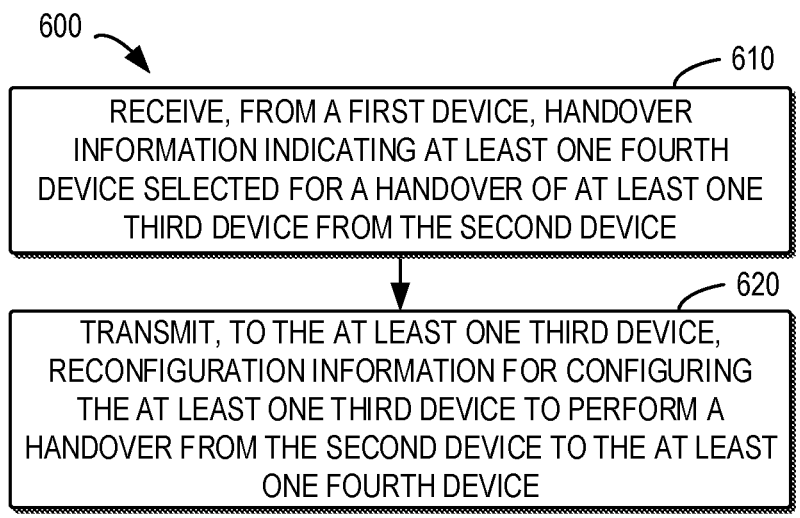
FIG. 6 illustrates a flowchart of a method implemented at a second device according to some other example embodiments of the present disclosure.

FIG. 6 shows a flowchart of an example method 600 implemented at a second device in accordance with some example embodiments of the present disclosure. For the purpose of discussion, the method 600 will be described from the perspective of the second device 120 with respect to FIG. 1 and FIG. 4.

At block 610, independent of a measurement report from at least one third device, the second device 120 receives, from a first device, handover information indicating at least one fourth device selected for a handover of at least one third device from the second device, the second device serving at least one third device. At block 620, the second device 120 transmits, to the at least one third device, reconfiguration information for configuring the at least one third device to perform a handover from the second device to the at least one fourth device.

In some example embodiments, the second device 120 transmits, to the first device, indication information comprising at least one of the following: information indicating that the second device is to move out of a service area for the at least one third device, information indicating that the second device is to be failed, or information indicating that the second device is to be deactivated.

In some example embodiments, the reconfiguration information comprises information indicating that the handover is triggered by a change of a service availability of the first device. In some example embodiments, the reconfiguration information is for conditional handover.

In some example embodiments, the at least one third device comprises a plurality of third devices. In some example embodiments, the second device 120 gradually reduces a transmit power of the second device to trigger fulfillment of handover conditions configured for the plurality of third devices.

Figure 7:
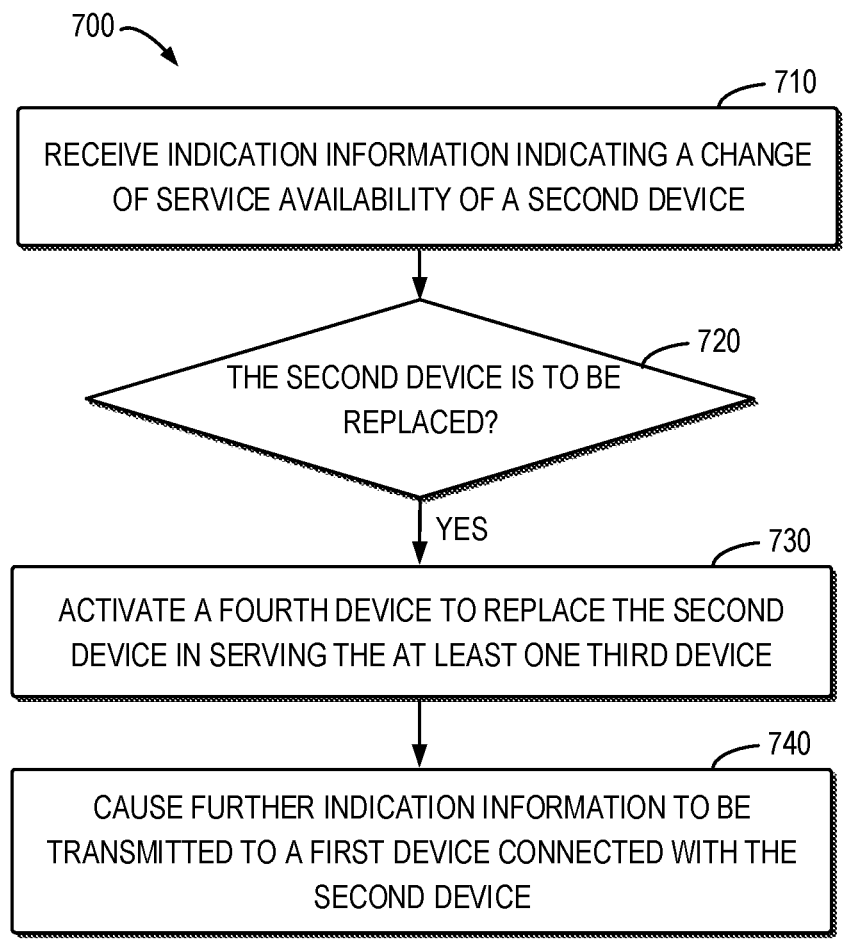
FIG. 7 illustrates a flowchart of a method implemented at a fifth device according to some other example embodiments of the present disclosure.

FIG. 7 shows a flowchart of an example method 700 implemented at a fifth device in accordance with some example embodiments of the present disclosure. For the purpose of discussion, the method 700 will be described from the perspective of the fifth device 150 with respect to FIG. 1 and FIG. 4.

At block 710, the fifth device 150 receives indication information indicating a change of service availability of a second device, the second device serving at least one third device and being managed by the fifth device. In some example embodiments, the fifth device 150 may receive at least part of the indication information from at least one of the first device and the second device. In some example embodiments, the indication information comprising at least one of the following: information indicating that the second device is to move out of a service area for the at least one third device, information indicating that the second device is to be failed, or information indicating that the second device is to be deactivated.

At block 720, the fifth device 150 determines, based on the indication information, whether the second device is to be replaced. At block 730, in accordance with a determination that the second device is to be replaced, the fifth device 150 activates a fourth device to replace the second device in serving the at least one third device. In some example embodiments, the fifth device 150 determines a fourth device from a plurality of candidate devices based on proximity information between the second device and the fourth device.

At block 740, the fifth device 150 causes further indication information to be transmitted to a first device connected with the second device, the further indication information indicating that the fourth device is to replace the second device in serving the at least one third device.

Example Apparatus

In some example embodiments, a first apparatus capable of performing any of the method 500 (for example, the first device 110) may comprise means for performing the respective operations of the method 500. The means may be implemented in any suitable form. For example, the means may be implemented in a circuitry or software module. The first apparatus may be implemented as or included in the first device 110.

In some example embodiments, the first apparatus comprises: means for receiving indication information indicating a change of service availability of a second apparatus (e.g., implemented as or included in the second device 120), the second apparatus serving at least one third apparatus (e.g., implemented as or included in the third device(s) 130); means for determining, based on the indication information, whether a handover of the at least one third apparatus from the second apparatus is to be triggered; and means for, in accordance with a determination that the handover of the at least one third apparatus is to be triggered, transmitting, to the second apparatus, handover information indicating at least one fourth apparatus (implemented as or included in the fourth devices 240 and/or 340) selected for the handover of the at least one third apparatus from the second apparatus.

In some example embodiments, the indication information comprises at least one of the following: information indicating that the second apparatus is to move out of a service area for the at least one third apparatus, information indicating that the second apparatus is to be failed, information indicating that the second apparatus is to be deactivated, or information indicating that the at least one fourth apparatus is configured to replace the second apparatus in serving the at least one third apparatus.

In some example embodiments, the means for receiving the indication information comprise means for receiving at least part of the indication information from at least one of the following: the second apparatus, an entity monitoring mobility of an object positioned in association with the second apparatus, a fifth apparatus configured for managing the second apparatus, and the at least one fourth apparatus.

In some example embodiments, the means for determining a handover of the at least one third apparatus comprises means for, independent of a measurement report from the at least one third apparatus, determining, based on the indication information, that a handover of the at least one third apparatus from the second apparatus is to be triggered.

In some example embodiments, the first apparatus further comprises means for selecting, from a plurality of candidate apparatuses, at least one fourth apparatus connected with the first apparatus and available for serving the at least one third apparatus.

In some example embodiments, the at least one third apparatus comprises a plurality of third apparatuses. In some example embodiments, the first apparatus further comprises means for selecting a plurality of groups of fourth apparatuses for the plurality of third apparatuses, each group of the plurality of groups of fourth apparatuses being selected for a handover of at least one of the plurality of third apparatuses from the second apparatus.

In some example embodiments, the at least one fourth apparatus comprises a new apparatus activated to replace the second apparatus.

In some example embodiments, the first apparatus comprises an integrated access and backhaul donor node. In some example embodiments, the second apparatus and the at least one fourth device comprise integrated access and backhaul nodes. In some example embodiments, the at least one third apparatus comprises at least one terminal device.

In some example embodiments, the first apparatus further comprises means for performing other operations in some example embodiments of the method 500. In some example embodiments, the means comprises at least one processor; and at least one memory including computer program code, the at least one memory and computer program code configured to, with the at least one processor, cause the performance of the first apparatus.

In some example embodiments, a second apparatus capable of performing any of the method 600 (for example, the second device 120) may comprise means for performing the respective operations of the method 600. The means may be implemented in any suitable form. For example, the means may be implemented in a circuitry or software module. The second apparatus may be implemented as or included in the second device 120.

In some example embodiments, the second apparatus comprises means for independent of a measurement report from at least one third apparatus (e.g., implemented as or included in the third device(s) 130), receiving, from a first apparatus (e.g., implemented as or included in the first device 110), handover information indicating at least one fourth apparatus (e.g., implemented as or included in the fourth devices 240 and/or 340) selected for a handover of at least one third apparatus from the second apparatus, the second apparatus serving the at least one third apparatus; and means for transmitting, to the at least one third apparatus, reconfiguration information for configuring the at least one third apparatus to perform a handover from the second apparatus to the at least one fourth apparatus.

In some example embodiments, the second apparatus further comprises means for transmitting, to the first apparatus, indication information comprising at least one of the following: information indicating that the second apparatus is to move out of a service area for the at least one third apparatus, information indicating that the second apparatus is to be failed, or information indicating that the second apparatus is to be deactivated.

In some example embodiments, the at least one third apparatus comprises a plurality of third apparatuses. In some example embodiments, the second apparatus further comprises means for gradually reducing a transmit power of the second apparatus to trigger fulfillment of handover conditions configured for the plurality of third apparatuses.

In some example embodiments, the reconfiguration information comprises information indicating that the handover is triggered by a change of a service availability of the first apparatus. In some example embodiments, the reconfiguration information is for conditional handover.

In some example embodiments, the first apparatus comprises an integrated access and backhaul donor node. In some example embodiments, the second apparatus and the at least one fourth device comprise integrated access and backhaul nodes. In some example embodiments, the at least one third apparatus comprises at least one terminal device.

In some example embodiments, the second apparatus further comprises means for performing other operations in some example embodiments of the method 600. In some example embodiments, the means comprises at least one processor; and at least one memory including computer program code, the at least one memory and computer program code configured to, with the at least one processor, cause the performance of the second apparatus.

In some example embodiments, a fifth apparatus capable of performing any of the method 700 (for example, the fifth device 150) may comprise means for performing the respective operations of the method 700. The means may be implemented in any suitable form. For example, the means may be implemented in a circuitry or software module. The fifth apparatus may be implemented as or included in the fifth device 150.

In some example embodiments, the fifth apparatus comprises means for receiving indication information indicating a change of service availability of a second apparatus (e.g., implemented as or included in the second device 120), the second apparatus serving at least one third apparatus (e.g., implemented as or included in the third device(s) 130) and being managed by the fifth apparatus (implemented as or included in the fifth device 150); means for determining, based on the indication information, whether the second apparatus is to be replaced; means for, in accordance with a determination that the second apparatus is to be replaced, activating a fourth apparatus (implemented as or included in the fourth device 340) to replace the second apparatus in serving the at least one third apparatus; and means for causing further indication information to be transmitted to a first apparatus (e.g., implemented as or included in the first device 110) connected with the second apparatus, the further indication information indicating that the fourth apparatus is to replace the second apparatus in serving the at least one third apparatus.

In some example embodiments, the indication information comprising at least one of the following: information indicating that the second apparatus is to move out of a service area for the at least one third apparatus, information indicating that the second apparatus is to be failed, or information indicating that the second apparatus is to be deactivated.

In some example embodiments, the means for activating the fourth apparatus comprises means for determining a fourth apparatus from a plurality of candidate apparatuses based on proximity information between the second apparatus and the fourth apparatus.

In some example embodiments, the means for receiving the indication information comprises means for receiving at least part of the indication information from at least one of the first apparatus and the second apparatus.

In some example embodiments, the fifth apparatus comprises an operation administration and maintenance (OAM) entity. In some example embodiments, the first apparatus comprises an integrated access and backhaul donor node. In some example embodiments, the second apparatus and the at least one fourth apparatus comprise integrated access and backhaul nodes. In some example embodiments, the at least one third apparatus comprises at least one terminal apparatus.

In some example embodiments, the fifth apparatus further comprises means for performing other operations in some example embodiments of the method 700. In some example embodiments, the means comprises at least one processor; and at least one memory including computer program code, the at least one memory and computer program code configured to, with the at least one processor, cause the performance of the fifth apparatus.

Example Device and Computer Readable Medium

Figure 8:
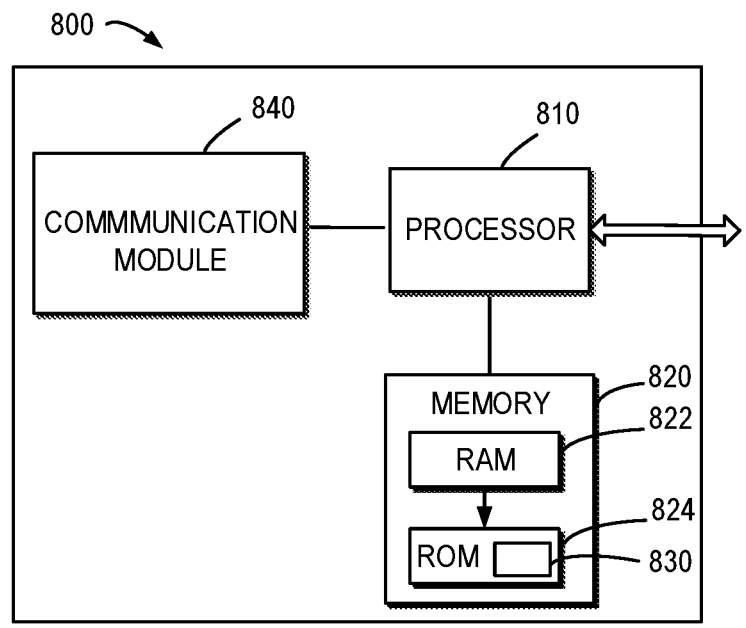
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 may be provided to implement a communication device, for example, the first device 110, the second device 120, the third device 130, the fourth device 140, 240, or 340, or the fifth device 150 as shown in FIG. 1, FIG. 2, and FIG. 3. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the memory, e.g., ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIG. 2, FIG. 4, and FIGS. 5 to 7. The example embodiments of the present disclosure may also be implemented by hardware or by a combination of software and hardware.

Figure 9:
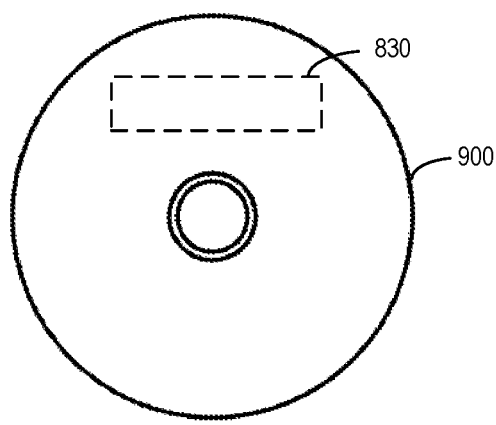
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 which may be in form of CD, DVD or other optical storage disk. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIG. 2, FIG. 4, and FIGS. 5 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one non-transitory memory storing instructions that, when executed with the at least one processor, cause the first device to:
   receive indication information indicating a change of service availability of a second device, the second device serving a plurality of third devices,
   wherein the indication information comprises: information indicating that the second device is to move out of a service area for the plurality of third devices, information indicating that the second device is to be failed, information indicating that the second device is to be deactivated, and information indicating that a plurality of fourth devices is configured to replace the second device in serving the plurality of third devices,
   wherein the first device is caused to receive the indication information with receiving at least part of the indication information from: the second device, an entity monitoring mobility of an object positioned in association with the second device, a fifth device configured for managing the second device, and the plurality of fourth devices,
   wherein the first device comprises an integrated access and backhaul donor node, wherein the second device comprises integrated access and backhaul nodes, and wherein the plurality of third devices comprises at least one terminal device;
   determine, based on the indication information, whether a handover of the plurality of third devices from the second device is to be triggered,
   wherein the first device is caused to determine the handover of the plurality of third devices by, independent of a measurement report from the plurality of third devices, determining, based on the indication information, that the handover of the plurality of third devices from the second device is to be triggered;

in accordance with a determination that the handover of the plurality of third devices is to be triggered, transmit, to the second device, handover information indicating at least one fourth device of the plurality of fourth devices selected for the handover of the plurality of third devices from the second device, wherein the at least one fourth device comprises a new device activated to replace the second device, wherein the at least one fourth device comprises integrated access and backhaul nodes; and select, from a plurality of candidate devices, at least another fourth device connected with the first device and available for serving the at least one third device.

* * * * *